United States Patent
Irshad et al.

(10) Patent No.: US 11,079,945 B2
(45) Date of Patent: Aug. 3, 2021

(54) DYNAMIC CONFIGURATION OF MEMORY TIMING PARAMETERS

(71) Applicant: ATI TECHNOLOGIES ULC, Markham (CA)

(72) Inventors: Omer Irshad, Markham (CA); Joohyun Lee, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/137,413

(22) Filed: Sep. 20, 2018

(65) Prior Publication Data

US 2020/0097201 A1 Mar. 26, 2020

(51) Int. Cl.
*G06F 3/00* (2006.01)
*G06F 3/06* (2006.01)
(Continued)

(52) U.S. Cl.
CPC ........ *G06F 3/0632* (2013.01); *G06F 3/04847* (2013.01); *G06F 3/0604* (2013.01);
(Continued)

(58) Field of Classification Search
CPC .. G06F 3/0632; G06F 3/04847; G06F 3/0604; G06F 9/4403; G06F 13/1694; G06F 711/154; G06F 713/60; G06F 713/345
See application file for complete search history.

(56) References Cited

U.S. PATENT DOCUMENTS 6,067,606 A * 5/2000 Holscher ............... G06F 9/4403
                                                711/150
6,334,174 B1 * 12/2001 Delp ................... G06F 13/1694
                                                365/194
(Continued)

FOREIGN PATENT DOCUMENTS

WO    2018090130 A1    5/2018

OTHER PUBLICATIONS

Website https://www.amd.com/en/technologies/radeon-wattman/, accessed Jul. 30, 2018, 3 pages.
(Continued)

*Primary Examiner* — Reginald G Bragdon
*Assistant Examiner* — Michael L Westbrook

(57) ABSTRACT

A processing system includes a memory controller coupleable to a RAM, and a ROM configured to store boot information that includes default values for a set of one or more memory timing parameters. At least one processor is configured to, during initialization, configure the memory controller to utilize the default values for the set of one or more memory timing parameters. The at least one processor further is configured to, during operation of the processing system following initialization, receive user input representing one or more updated values for one or more corresponding memory timing parameters of the set, and to dynamically reconfigure the memory controller to utilize one or more updated values for the set of one or more memory timing parameters for the signaling. The processing system further
(Continued)

is configured to conduct one or more memory access operations for the RAM using the reconfigured memory controller.

20 Claims, 5 Drawing Sheets

(51) Int. Cl.
| | |
|---|---|
| *G06T 1/60* | (2006.01) |
| *G06F 3/0484* | (2013.01) |
| *G06F 9/4401* | (2018.01) |
| *G06F 13/16* | (2006.01) |
| *G06T 1/20* | (2006.01) |
| *G06F 3/0482* | (2013.01) |

(52) U.S. Cl.
CPC ............ *G06F 3/068* (2013.01); *G06F 9/4403* (2013.01); *G06F 13/1694* (2013.01); *G06T 1/60* (2013.01); *G06F 3/0482* (2013.01); *G06T 1/20* (2013.01)

(56) References Cited

U.S. PATENT DOCUMENTS

| | | | | |
|---|---|---|---|---|
| 6,530,001 | B1* | 3/2003 | Lee ........................... | G06F 1/06 710/58 |
| 7,382,366 | B1* | 6/2008 | Klock ...................... | G06F 1/206 345/213 |
| 7,469,355 | B1* | 12/2008 | Chong ..................... | G06F 1/206 713/600 |
| 7,865,709 | B2 | 1/2011 | Lee | |
| 8,006,062 | B1 | 8/2011 | Cheng et al. | |
| 2005/0039067 | A1* | 2/2005 | Tsau ......................... | G06F 1/08 713/600 |
| 2005/0071705 | A1* | 3/2005 | Bruno ...................... | G06F 1/206 713/500 |
| 2005/0212781 | A1* | 9/2005 | Clapper .................. | G06F 1/181 345/184 |
| 2006/0044219 | A1* | 3/2006 | Kao ........................ | G09G 3/003 345/7 |
| 2007/0174650 | A1* | 7/2007 | Won ........................ | G06F 1/206 713/600 |
| 2009/0225090 | A1* | 9/2009 | Chiu ....................... | G09G 5/363 345/520 |
| 2010/0058048 | A1* | 3/2010 | Gotcher .............. | G06F 9/44505 713/100 |
| 2010/0146172 | A1* | 6/2010 | Sidiropoulos ............. | G06F 1/10 710/107 |
| 2014/0095854 | A1* | 4/2014 | Chen ..................... | G06F 9/4403 713/1 |
| 2014/0348465 | A1* | 11/2014 | Morris ..................... | G02B 6/28 385/18 |
| 2014/0359196 | A1* | 12/2014 | Ragland ................ | G06F 3/0634 711/102 |
| 2017/0262354 | A1* | 9/2017 | Han ...................... | G06F 1/3206 |

OTHER PUBLICATIONS

Website https://support.amd.com/en-us/kb-articles/Pages/DH-020.aspx, accessed Jul. 30, 2018, 10 pages.
Website https://www.pcworld.com/article/3094984/components-graphics/how-to-use-amds-wattman-the-powerful-new-overclocking-tool-for-radeon-graphics-cards.html, accessed Jul. 30, 2018, 12 pages.
"TN-ED-01: GDDR5 SGRAM Introduction", Micron Technology, Inc., 2014, 18 pages.
International Search Report and Written Opinion dated Nov. 19, 2019 for International Application No. PCT/IB2019/055342, 8 pages.

\* cited by examiner

DYNAMIC CONFIGURATION OF MEMORY TIMING PARAMETERS

BACKGROUND

The signaling between a memory and a corresponding memory controller is dictated by various timing parameters specified by a corresponding signaling protocol. In a conventional processing system, the memory controller is programmed with fixed values for the set of memory timing parameters during initial system configuration (i.e., during boot up), and the memory controller uses these same fixed values for the memory timing parameters for all subsequent memory access operations. The fixed, or default, memory timing parameter values typically are stored in a basic input/output system (BIOS) or other boot read-only memory (ROM) and are typically based on the memory manufacturer's recommendation or specification. As such, these default memory timing parameter values are configured to be conservative timing values in an attempt to provide stable operation for most or all anticipated system configurations.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
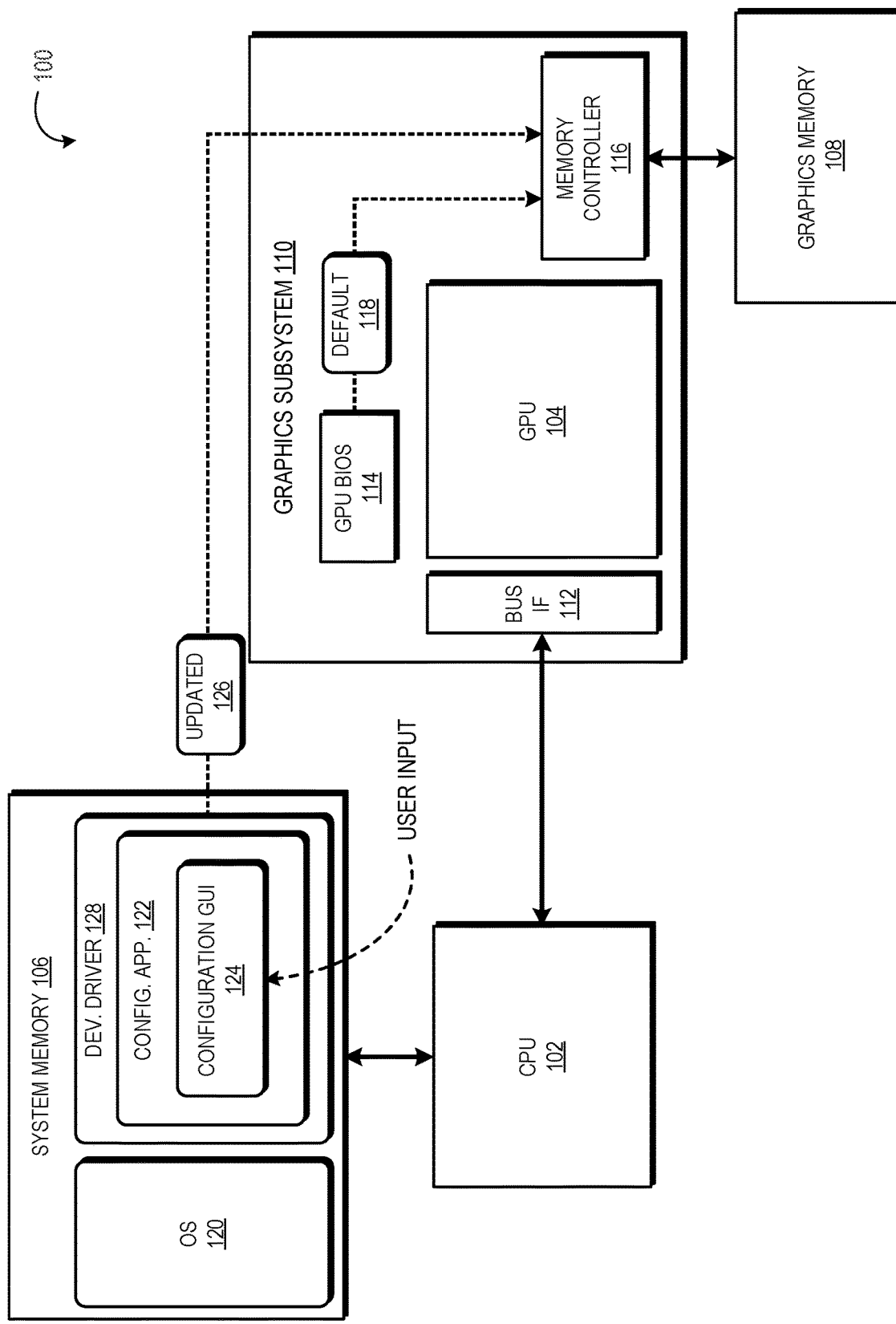
FIG. 1 is a block diagram illustrating a processing system having a dynamically reconfigurable memory controller in accordance with some embodiments.

The conventional approach of configuring a BIOS or other boot ROM with a fixed set of conservative memory timing parameter values typically achieves the desired result of providing sufficient timing margins to accommodate a variety of system implementations. However, in many instances the workload or system implementation will not require the timing margins provided by the fixed set of conservative memory timing parameters, and in such instances the excess timing margin typically will unnecessarily impede memory speed and thus limit overall processing performance. Accordingly, to facilitate improved system performance, systems and techniques for dynamic reconfiguration of a set of one or more memory timing parameters of a memory controller during post-initialization operation are disclosed herein. In at least one embodiment, the processing system initializes by configuring the memory controller with a default set of memory timing parameter values obtained from a boot configuration. When the system enters a post-initialization operational mode, the system is configured to provide a graphical user interface (GUI) or other user interface to receive user input indicating updated values for one or more of a set of memory timing parameters utilized by the memory controller to configure signaling conducted between the memory controller and the memory. In some embodiments, the user may provide user input that provides updated memory timing parameter values on an individual memory timing parameter basis. However, because many memory timing parameters are highly inter-dependent, in other embodiments a plurality of sets of pre-configured memory timing parameter values are provided as options to the user, and the user then selects a particular set of pre-configured memory timing parameter values as the updated set of memory timing parameter values.

In response to receiving the user input indicating a set of one or more updated memory timing parameters to be employed, the processing system idles the memory controller, and while the memory controller is idled, a device driver or other component of the processing system dynamically reconfigures the memory controller to start using the set of one or more updated memory timing parameters in place of the previous values. The memory controller is then permitted to exit its idle state and start conducting memory operations using signaling based on the updated memory timing parameter values. In this manner, the memory controller is dynamically reconfigured during system operation (that is, reconfigured without requiring a re-boot, power-on reset, or other system re-initialization) so as to implement updated memory timing parameters that are better tuned to the particular workload or system configuration being implemented compared to the default, fixed set of memory timing parameter values configured for the memory controller during system initialization. The user thus is permitted to fine tune the memory controller to provide reduced memory access latency, and thus increased system performance, for an anticipated workload or other system configuration.

For purposes of illustration, examples of this dynamic memory timing parameter reconfiguration technique are described in the context of dynamic reconfiguration of the memory controller for a graphics processing unit (GPU) or graphics memory. However, this technique is not limited to this example context, but instead may be employed for dynamic reconfiguration of any of a variety of memory controller types, including memory controllers for system memory, memory controllers for off-chip caches, and the like.

FIG. 1 illustrates a processing system 100 employing dynamic memory timing reconfiguration in accordance with at least one embodiment. The processing system 100 includes one or more processors, such as a central processing unit (CPU) 102 and a graphics processing unit (GPU) 104, and one or more random access memories (RAMs), such as a system memory 106 and a graphics memory 108. In the illustrated embodiment, the GPU 104 is implemented in a graphics subsystem 110 (e.g., a graphics card), which further includes a bus interface 112 to connect to the CPU 102, a GPU BIOS 114 to store initialization information for the graphics subsystem 110, and a memory controller 116 to control access to the graphics memory 108 on behalf of the GPU 104. Other well-known components of a processing system, such as a northbridge connecting the CPU and graphics subsystem 110, input/output (I/O) management components, and the like, are omitted for purposes of clarity.

As an overview of general operation of the processing system 100, in response to a power on reset (POR) or other start-up event, the CPU 102 begins a boot initialization process using boot information stored in a system BIOS, Unified Extensive Firmware Interface (UEFI), or other system boot ROM (not shown). During this system initialization process, the graphics subsystem 110 is triggered to begin its own initialization process, which includes initializing various components of the graphics subsystem 110 using boot information stored in the GPU BIOS 114. The boot information of the GPU BIOS 114 includes a default set 118 of memory timing parameter values, which are used during the initialization process to initialize the memory controller 116 to implement default memory timings represented by this default set 118 of memory timing parameter values. As described in detail below, in some embodiments the initialization of the memory controller 116 includes writing each memory timing parameter value of the default set 118 to a corresponding control register, which in turn serves to control the operation of corresponding circuitry of the memory controller 116 so as to provide the corresponding memory timing parameter in the signaling conducted between the memory controller and the graphics memory 108.

After system initialization has completed, the processing system 100 enters an operational mode, during which the CPU 102 executes an operating system (OS) 120 and one or more software applications (e.g., graphics configuration utility application 122) at least partially stored in system memory 106. While in this operational mode, the CPU 102 or other component may task the graphics subsystem 110 via a device driver 128 executed by the CPU 102 with workloads to execute, such as graphics rendering workloads, encryption workloads, machine learning workloads, blockchain operation workloads, and the like.

In executing these workloads, the GPU 104 relies on the memory controller 116 to conduct memory accesses to the graphics memory 108 with signaling configured in accordance with the set of memory timing parameter values stored at the memory controller 116. As described above, during system initialization, the memory controller 116 is configured with the default set 118 of memory timing parameter values, which typically has been selected to employ conservative memory timing parameter values so as to provide ample timing margins so that the graphics subsystem 110 operates stably under a variety of workloads or configurations. However, the default timing parameters configured for the memory controller 116 may lead to excess memory latency, and thus degraded performance, for the particular workload tasked to, or to be tasked to, the graphics subsystem 110.

Accordingly, the processing system 100 allows user-directed reconfiguration of memory timing parameters of the memory controller 116 during operation (that is, dynamically) so as to better tune the memory signaling between the memory controller 116 and the graphics memory 108 to the particular characteristics of the workload. In at least one embodiment, the processing system 100 facilitates user input in this regard by providing a configuration GUI 124 through which the user provides input indicating selection of an updated set 126 of one or more memory timing parameter values and signal the processing system 100 to update the memory controller 116 according to this updated set 126. To illustrate, in some embodiments the processing system 100 employs the graphics configuration utility application 122 to aid the user in tuning various aspects of the graphics subsystem 110, and the configuration GUI 124 may be provided as part of execution of the graphics configuration utility application 122 by the CPU 102. As described in greater detail below, the configuration GUI 124 may support the update of individual memory timing parameters, or in view of the interrelatedness of many of the memory timing parameters, the configuration GUI 124 may provide a plurality of predetermined sets of memory timing parameter values from which the user may select one predetermined set for implementation as the updated set 126 of memory timing parameter values used to reconfigure the memory controller 116. This process of initial configuration of the memory controller 116 based on default memory timing parameter values and then subsequently dynamically reconfiguring the memory controller 116 with user-specified memory timing parameter values is described in greater detail below with reference to FIGS. 3 and 4.

Figure 2:
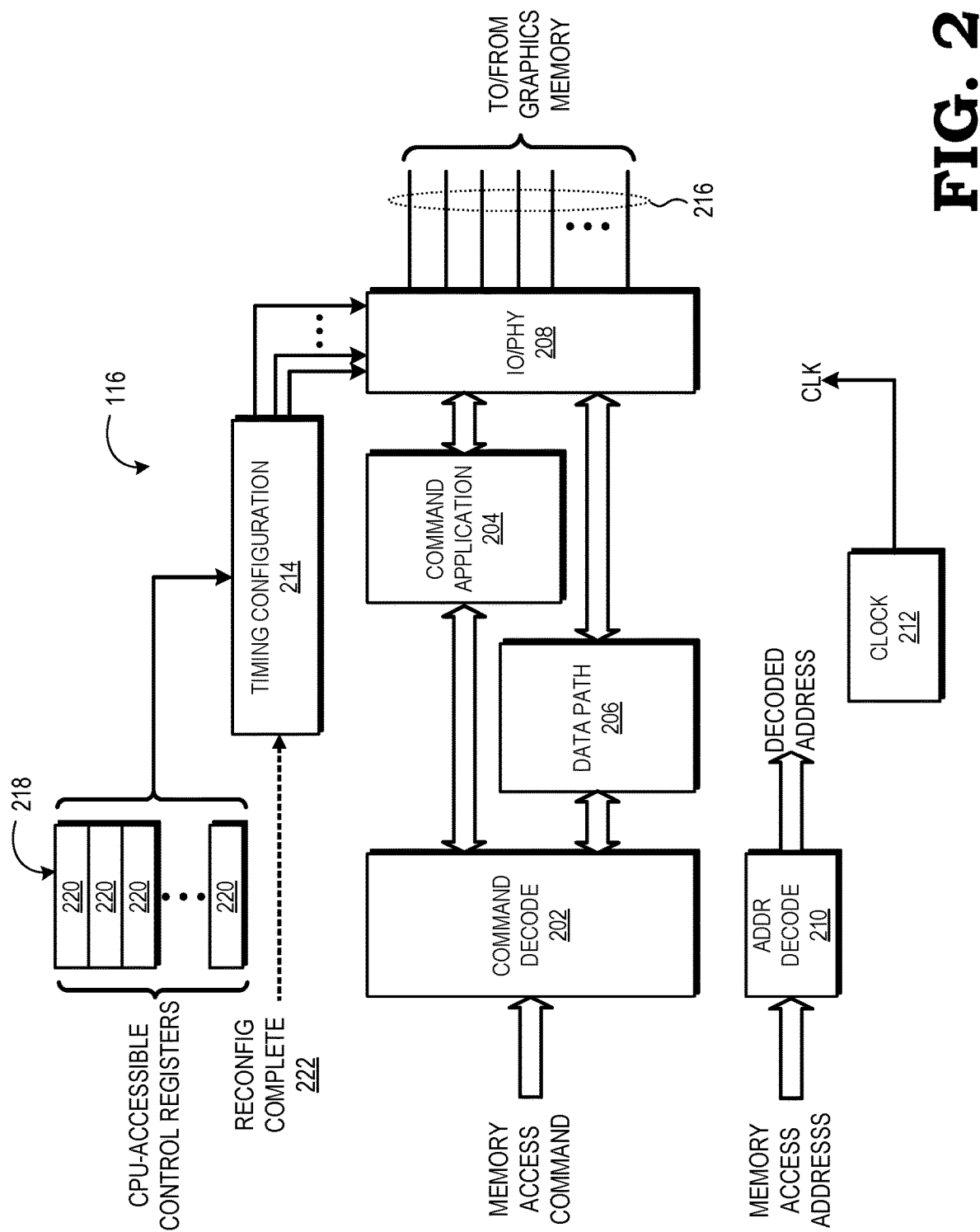
FIG. 2 is a block diagram illustrating an example implementation of the dynamically reconfigurable memory controller of FIG. 1 in accordance with some embodiments.

FIG. 2 illustrates an example implementation of the memory controller 116 in accordance with at least one embodiment. The memory controller 116 includes a command decode module 202, a command application module 204, a data path 206, an input-output (10) signaling module 208 (often referred to as a physical interface, or "PHY"), an address (ADDR) decode module 210, a clock module 212, and a timing configuration module 214. Each of these components is implemented as circuitry configured to perform the operations described herein and other operations known in the art. The logic aspects of these components may be implemented as hard-coded logic, programmable logic, or a combination thereof.

A memory access operation (e.g., a READ operation or WRITE operation) provided by the GPU 104 or other component of the graphics subsystem 110 generally is composed of at least two portions: a memory access command portion representing the particular command, or operation, to be implemented by the memory controller 116, and a memory access address (ADDR) representing an address or location of the storage location in graphics memory 108 that is the subject of the command or operation to be implemented. The address decode module 210 operates to decode or translate the received memory address to an address more closely aligned with the physical location of the storage location (e.g., a virtual address to physical address location), and this decoded address is provided to the other components as needed for their own respective operations. The command decode module 202 translates the command value of the received memory access operation to one or more respective commands, which the command application module 204 uses to control the IO/PHY 208 to conduct the signaling 216 between the I/O PHY 208 and the graphics memory 108 representative of these commands and to control the IO/PHY 208 to receive and interpret any data or control information in the signaling provided from the graphics memory 108 to the IO/PHY 208. The data path 206 serves to provide any data values to be stored to the graphics memory 208 as part of the memory operation to the IO/PHY 208 and to provide any data values received from the IO/PHY 208 to the command decode module 202. The signaling of the IO/PHY 208 is clocked to, or timed by, at least one clock signal (CLK) provided by the clock module 212.

The generation, timing, formatting, and interpretation of signaling sent by the IO/PHY 208 to the graphics memory 108 and of signaling sent by the graphics memory 108 to the IO/PHY 208 (herein collectively "the signaling 216") is dictated by a memory interface protocol associated with the memory type of the graphics memory 108. To illustrate, synchronous dynamic random access memories (SDRAMs)

implemented in accordance with one of the double data rate (DDR) signaling protocols (DDR, DDR2, DDR3, DDR4, GDDR5, etc.) are subject to specified memory timings, such as: CL (Column Access Strobe (CAS) Latency), which generally represents the delay between when the memory receives a request for data from a specified location from a memory controller and when the memory is able to make the data available on its output pins; tRCD (RAS to CAS Delay), which generally represents the time it takes between the activation of the line via row address strobe (RAS) and the column via CAS at the targeted memory location; and tRP (RAS Precharge), which generally represents the time between when access to a line of data is disabled and when access to another line of data is enabled. It should be noted that while three examples of memory timing parameters have been described, the typical number of memory timing parameters specified by a memory signaling protocol often includes dozens of such timing parameters.

In at least one embodiment, the memory controller 116 implements some or all of the memory timing parameters specified by the corresponding memory signaling protocol using a set 218 of control registers 220, with each control register 220 storing one or more memory timing parameter values for implementation at the memory controller 116. To illustrate, in one implementation each memory timing parameter is represented as, for example, an eight-bit value and each control register 220 has a width of, for example, 32 bits, and thus each control register 220 stores up to four corresponding memory timing parameter values. The values in the control registers 220 then may directly or indirectly configure or control the other components 202, 204, 206, 208, and 210 of the memory controller 116 to effect the corresponding memory timings. For example, for a memory timing parameter that requires the memory controller 116 to wait a certain amount of time following an event, the position of the corresponding memory timing parameter value in the corresponding control register 220 serves as the input into a count-down timer or comparator that is clocked by a clock signal CLK. Alternatively, the timing configuration module 214 copies the corresponding value to a set of flops or other temporary storage component that serves as the input to the timer or comparator or programs programmable logic to implement the corresponding memory timing. As another example, when the memory timing parameter value pertains to the clock speed of the graphics memory 108 (MCLK), then the timing configuration module 214 configures the clock module 212 based on the memory timing parameter value stored in the corresponding control register 220 to configure the clock module 212 to provide the clock signal CLK with a frequency commensurate with the intended memory speed.

As described above, the graphics BIOS 114 stores the default set 218 of one or more memory timing parameter values utilized to initialize the memory controller 116 during system initialization, and thus the set 218 of control registers 220 is accessible by the graphics subsystem 110 so as to copy the one or more default memory timing parameter values from the default set 218 to the corresponding positions within the control registers 220. Likewise, as the memory controller 116 is dynamically reconfigurable after this initialization configuration, the set 218 of control registers 220 are accessible by the CPU 102 so that the memory timing parameter values in the control registers 220 can be updated (e.g., via the graphics configuration utility application 122 and the device driver 128) as described in detail herein.

Figure 3:
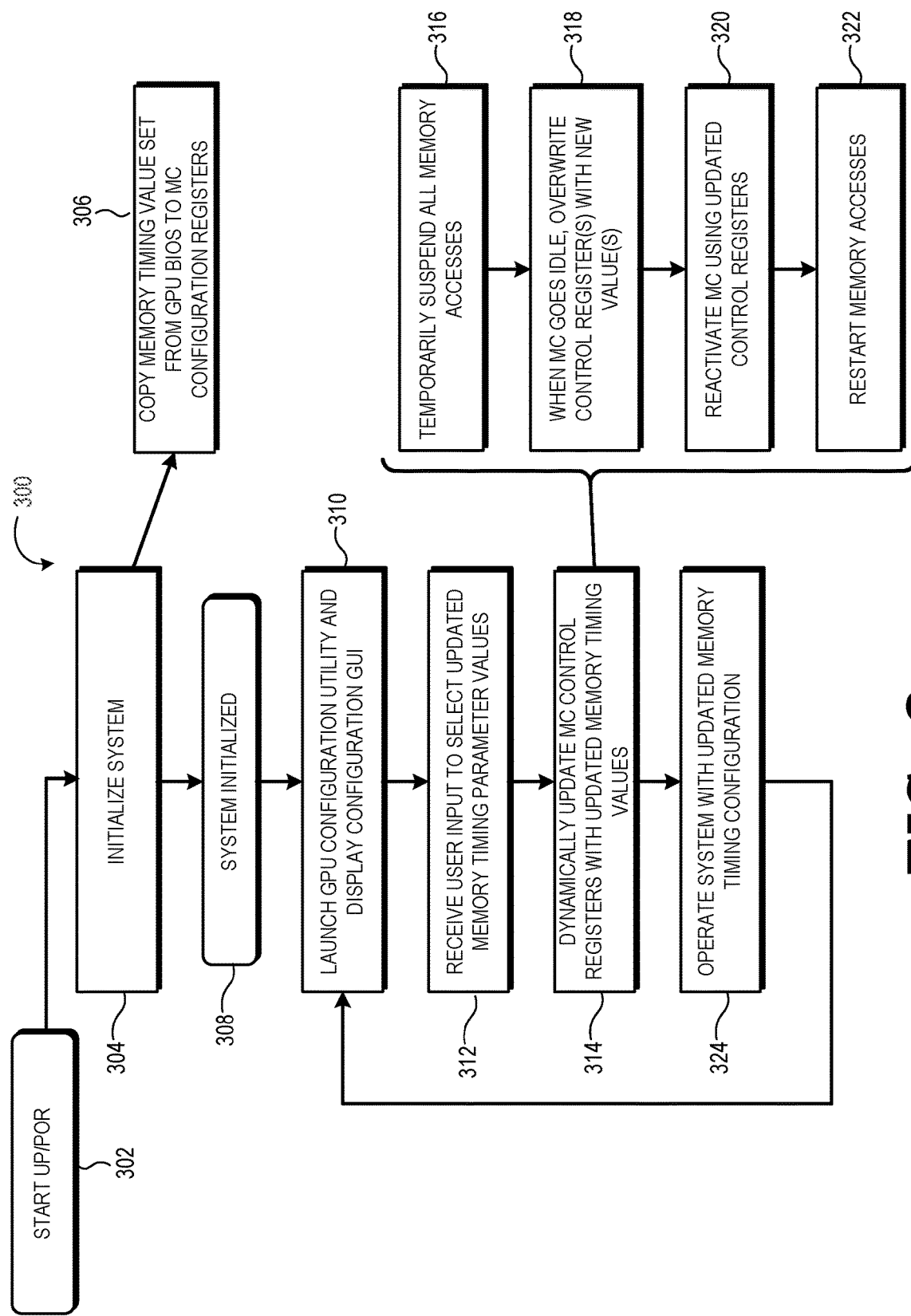
FIG. 3 is a flow diagram illustrating a method for dynamically reconfiguring a set of memory timing parameters for a memory controller in accordance with at least some embodiments.

FIG. 3 illustrates an example method 300 of operation of a processing system employing dynamic updating of the memory timing parameters employed by a memory controller in accordance with some embodiments. For ease of illustration, the method 300 is described in the example context of the processing system 100 of FIGS. 1 and 2. However, this method is not limited to this context, but instead is implementable in any of a variety of processing systems employing a configurable memory controller using the guidelines provided herein. The method 300 starts with an event that triggers system initialization of the processing system 302, such as a power-on reset (POR) or initial provision of power from a power source. In response to this triggering event, at block 304 the processing system 100 performs a system initialization system, which includes a boot process from a system BIOS or other boot ROM to initialize the CPU 102 and its corresponding components, as well as a boot process for the Graphics subsystem 110. As part of this Graphics subsystem boot process, at block 306 the Graphics subsystem 110 initially configures the memory controller 116 by accessing the default set 118 of memory timing parameter values configured in the GPU BIOS 114 for the particular type or make of the graphics memory 108 and copying these default memory timing parameters values to the appropriate control registers 220 of the set 218 of the memory controller 116. In this manner, the Graphics subsystem 110 initializes the memory controller 116 to operate in accordance with conservative memory timings intended to facilitate stable operation of the memory controller 116 and the graphics memory 108 under a variety of workloads.

After system initialization is complete (represented by block 308), the processing system 100 enters an operational mode or state during which one or more software applications are executed with the assistance of the OS 120. The OS 120 and at least some of such software applications assign one or more workloads to the Graphics subsystem 110 for execution. These workloads include, for example, graphics rendering workloads, blockchain computational workloads, machine learning-based workloads, and the like. While configuration of the memory controller 116 with the default set 118 of memory timing parameter values during system initialization typically allows the memory controller 116 and graphics memory 108 to operable stably for any of these workloads, the resulting memory timings may be sub-optimal for the particular workload assigned to the graphics subsystem 110, and thus inhibit the performance of execution of this workload.

Accordingly, to initiate the process of dynamically reconfiguring the memory controller 116 to fine tune its memory timings configuration to better suit a particular workload, at block 310 the user interfaces with the OS 120 to launch the GPU configuration utility application 122. As part of its execution, the GPU configuration utility application 122 provides the configuration GUI 124 for display. The configuration GUI 124 includes features for receiving user input to change or otherwise update one or more memory timing parameter values for the memory controller 116. An example of the configuration GUI 124 is described below with reference to FIG. 5.

At block 312, the user manipulates the configuration GUI 124 to provide user input to select one or more updated memory timing parameter values (as updated set 126) for enactment at the memory controller 116 while the processing system 100 is in the operational mode. In some embodiments, this user input is provided on a per-memory-timing-parameter basis; that is, the user is able to specify an updated value for each memory timing parameter individually. In such an implementation, the configuration GUI 124 provides any of a variety of input features to facilitate user input or selection of individual updated memory timing parameter values, such as through the use of pull-down lists, blank numeral entry fields, and the like. To prevent user input of a memory timing parameter value that is incompatible with the graphics memory 108 or with another memory timing parameter value, the configuration GUI 124 may range limit the user's selection for a given memory timing parameter value. However, as many of the memory timing parameters are inter-related, in other embodiments the configuration GUI 124 provides a plurality of predetermined alternative sets of memory timing parameter values that have been verified to be compatible with each other. In such implementations, the user then may provide user input indicating selection of one of these predetermined sets of memory timing parameters. The process of determining and providing these alternative sets of memory timing parameters is described below with reference to FIG. 4.

In response to receiving the user input via the configuration GUI 124, at block 314 the GPU configuration utility application 122 initiates the reconfiguration of the memory timings implemented by the memory controller 116 based on this user input. Blocks 316-322 of FIG. 3 illustrate this dynamic reconfiguration process. In preparation for reconfiguration of the memory controller 116, at block 316 the graphics subsystem 110 temporarily suspends all memory access operations to the graphics memory 108. The graphics subsystem 110 also halts or "freezes" the MCLK clock signal (e.g., MCLK) if MLK switching is enabled and then disables or exits a stutter mode if implemented. In some embodiments, those memory access operations already in flight are permitted to complete, while any buffered memory access operations are halted from proceeding.

In response to the graphics subsystem 110 signaling that the memory controller 116 has become idle following initiation of the temporary suspension (that is, there are no more memory access operations currently in flight), the device driver 128 suspends the YCLK signal and then initiates reconfiguration of the memory controller 116 by initiating transfer of the user-selected updated set 126 of one or more memory timing parameter values from their temporary storage locations at the CPU 102 or in system memory 106 to the respective control registers 220 of the set 218 in the memory controller 116. In at least one embodiment, the set 218 of control registers 220 is accessed and managed by the device driver 128 for the graphics subsystem 110, and device driver 128 manages the process of overwriting the current values in the control registers 220 with the updated values of the updated set 126. To illustrate, in some embodiments, the device driver 128 executes a particular VBIOS command DynamicMemorySettings( ) that in turn calls microcode functions of the memory controller 116 that program/overwrite the memory timing values of the memory control registers 220 using the values of the updated set 126 (which are passed to the memory controller 116 as parameters of the DynamicMemorySettings command). When the writing of the updated memory timing parameter values of the updated set 126 to the control registers 220 has completed, the reconfiguration complete signal 222 (FIG. 2) is asserted.

In response to the assertion of the reconfiguration complete signal 222, at block 320 the memory controller 116 is reactivated to use the memory timing parameter values currently stored in the set 218 of control registers 220, including those updated values stored in the process of block 318. This reactivation includes, for example, activating the YCLK signal, releasing the memory controller 116 from blackout, then reenabling stutter mode, and if MCLK switching is enabled, then reactivating the MLCK signal. This reactivation further includes, for example, storing a copy of a memory timing parameter value from a control register 220 to a buffer of a circuit of the memory controller 116 that directly controls some aspect of the memory signaling, and the like. When the reactivation of the memory controller 116 completes, at block 322 the graphics subsystem 110 lifts the temporary suspension and enables the memory controller 116 to begin processing memory access operations using the updated memory timings represented by the updated memory timing parameter values specified by the user input. Accordingly, at block 324 the OS 120 or another software application directs the graphics subsystem 110 to execute a specified workload, during which the memory controller 116 performs memory access operations using signaling based on these updated memory timings. In some embodiments, it may take experimentation on the part of the user to identify the particular set of memory timing parameter values that provide the best or more optimal memory operation performance for a given workload. Accordingly, in some embodiments, the process of dynamic reconfiguration of the memory controller 116 using updated memory timing parameter values is repeated for one or more iterations until the user has identified a satisfactory memory timing configuration for the corresponding workload.

Figure 4:
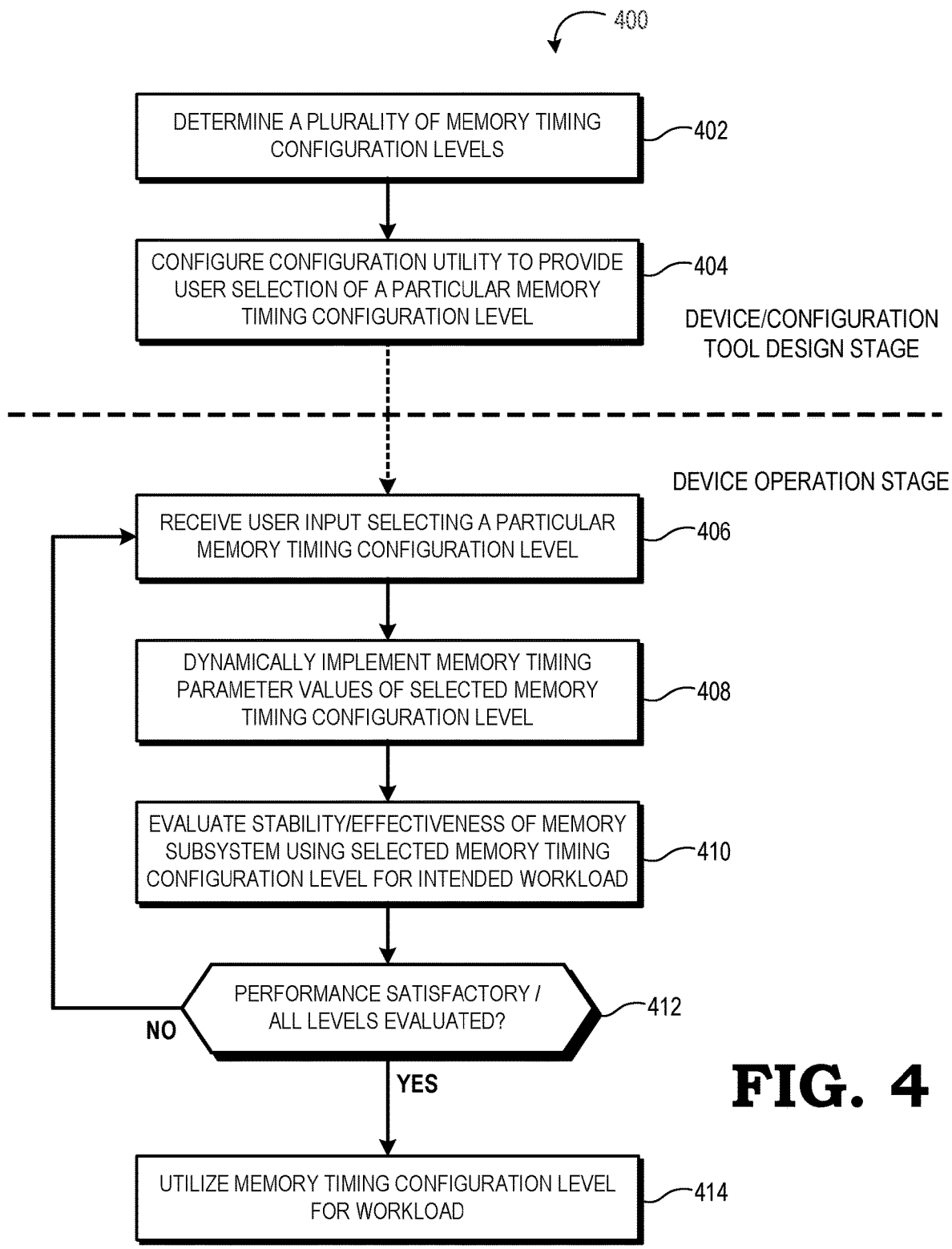
FIG. 4 is a flow diagram illustrating a method for facilitating user selection of a plurality of pre-defined sets of memory timing parameter values for dynamic reconfiguration in accordance with some embodiments.

FIG. 4 illustrates an example method 400 for dynamic reconfiguration of the memory timings of a memory controller via user selection among pre-defined sets of alternative memory timing parameter values in accordance with some embodiments. The method 400 is described in the example context of the processing system of FIGS. 1 and 2. The method 400 is separated into a device/configuration utility design stage and a device operation stage. As described above, due to the interrelatedness of memory timings, it may be impracticable to allow a user to individually tune memory timings without resulting in unstable memory controller operation. Accordingly, during the device/configuration utility design stage at block 402, a designer, supplier, or other party involved with the provision or implementation of the graphics subsystem 110 determines a plurality of alternative sets of memory timing parameter values, with each such set also being referred to herein as a memory timing configuration level. Each memory timing configuration level represents a set of memory timing parameter values that has been determined to provide minimally stable operation of the memory controller 116 and graphics memory 108, with each successive level providing tighter timing margins for one or more corresponding memory timing parameters. This evaluation and determination may be made using, for example, simulation software that utilizes the design of the memory controller 116 and the graphics memory 108 to iterate through various permutations of memory timing parameter values, and from those identify combinations of memory timing parameter values that are consistent with each other and which provide at least a target degree of stability.

At block 404, the party designs or configures the GPU configuration utility application 122 to present at least a subset of the memory timing configuration levels as selectable options for the user via the configuration GUI 124. In some embodiments, each memory timing configuration level identified at block 402 is provided as an option. In other embodiments, a smaller subset of the memory timing configuration levels are selected to be provided as user-selectable options. For example, in the event that there are only insubstantial performance differences between many of the memory timing levels, only a small number of memory timing configuration levels (e.g., three, four, or five memory timing configuration levels) may be provided as options to the user, with the included memory timing configuration levels being selected on, for example, the basis of stability, of degree of expected performance enhancement, on expectation of likely workload types, and the like.

Figure 5:
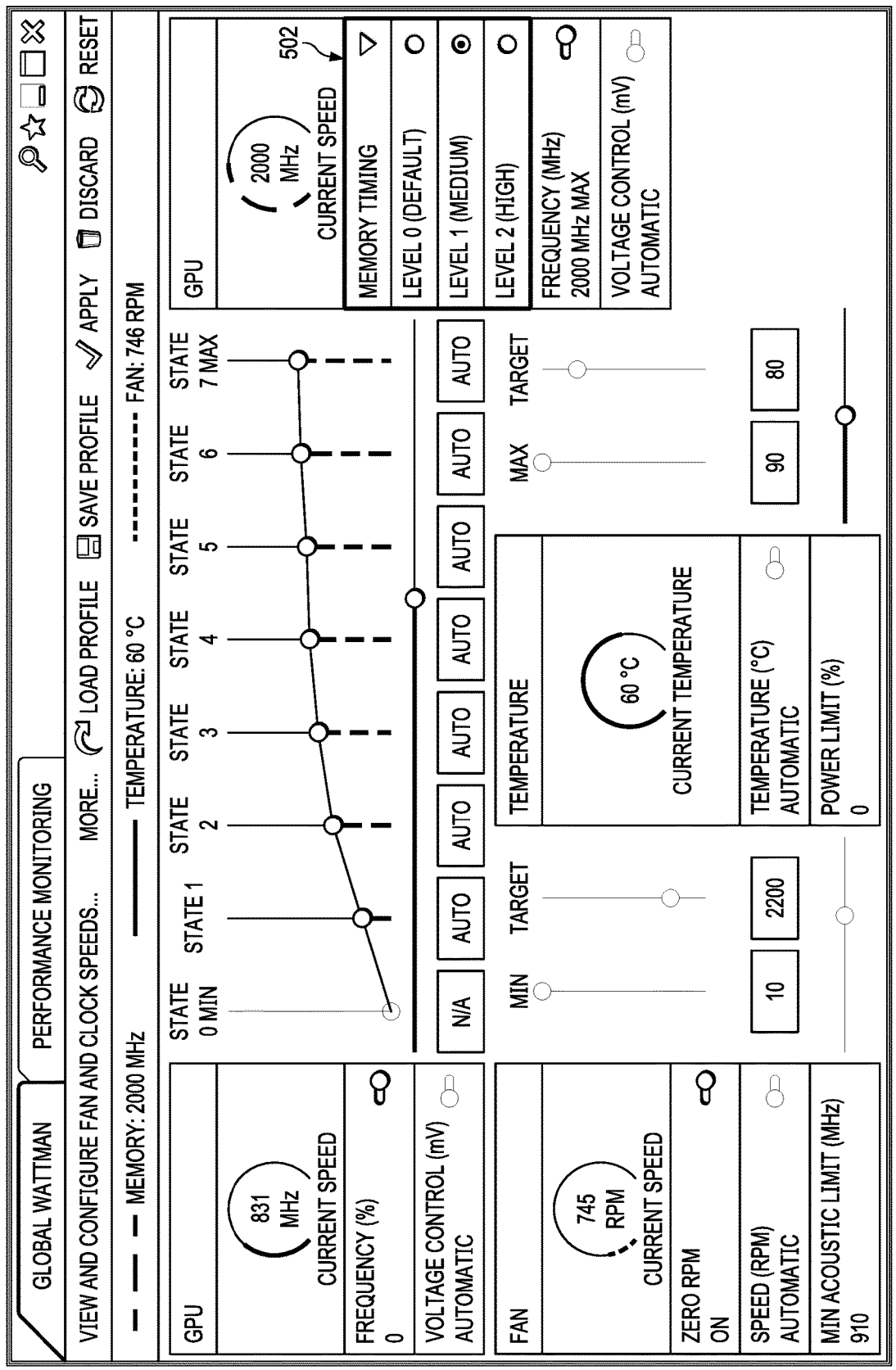
FIG. 5 is a diagram illustrating an example graphics user interface (GUI) for receiving user input indicating selection of a set of memory timing parameter values for implementation at a memory controller in accordance with some embodiments.

Referring briefly to FIG. 5, an example implementation of the configuration GUI 124 for providing user-selectable memory timing levels is illustrated. For purposes of this example, the GUI 124 is depicted as an extension of the Radeon WattMan configuration utility application available from Advanced Micro Devices, Inc. The Radeon WattMan application provides a GUI, such as one illustrated by FIG. 5, through which the user observes or changes various parameters or configurations of a corresponding graphics subsystem, such as frequency, temperature, voltage, and the like. The configuration GUI 124 of FIG. 5 further extends this functionality by adding a memory timing level feature 502 that visually depicts the plurality of memory timing configuration levels available to the use and which is manipulated by the user to provide user input indicating selection of one of these available memory timing configuration levels. In the illustrated example, the memory timing level feature 502 is depicted as a pull-down list providing three memory timing configuration levels, the first of which is the default memory timing configuration level represented by the default set 118 of memory timing parameter values implemented at system initialization and the remaining two representing increasingly reduced memory timing margins. Further in the illustrated example, each memory timing configuration level option includes a radio button to indicate user selection, which may be implemented immediately or through user selection of another feature, such as the illustrated "Apply" feature in the top right corner of the configuration GUI 124.

Referring back to FIG. 4, with the design and configuration of the GPU configuration utility application 122 complete, this software tool may be released for use by users of a processing system 100 for which the tool was designed. Thus, entering the device operation stage, the user directs the processing system 100 to execute the GPU configuration utility application 122, which in turn triggers the display of the configuration GUI 124. At block 406, the configuration GUI 124 receives user input indicating selection of a particular one of the memory timing configuration level options presented in the configuration GUI 124 (e.g., selection of the radio button associated with the corresponding memory timing configuration level). At block 408, the GPU configuration utility application 122 directs the Graphics subsystem 110 to dynamically implement the memory timing parameter values of the selected memory timing configuration level at the memory controller 116 using the process described above with reference to block 314 of method 300.

When the memory controller 116 is so reconfigured, at block 410 the user executes a workload using the selected memory timings and then evaluates the stability and/or effectiveness of the memory subsystem for the selected workload. In the event that the user is satisfied with the performance (block 412), then at block 414 the user maintains the current memory timings for executing one or more iterations of the workload or variations of the workload. In the event that the user is not satisfied with the performance under the current memory timings, the user may return to the configuration GUI and repeat the process of blocks 406-412 with another selected memory timing configuration level until the user identifies a most optimal, or most satisfactory, memory timing configuration for the Graphics subsystem 110.

In some embodiments, the systems and techniques described above are implemented in a system including one or more integrated circuit (IC) devices (also referred to as integrated circuit packages or microchips), such as the components of the processing system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
during initialization of a processing system, configuring a memory controller of the processing system to utilize default values for a set of one or more memory timing parameters for signaling between the memory controller and a corresponding memory of the processing system; and
during operation of the processing system following initialization:
executing a graphics configuration application to provide a configuration graphical user interface (GUI);
receiving, at the configuration GUI, user input representing an updated value for one or more memory timing parameters of the set;
dynamically reconfiguring the memory controller to utilize the updated value for the one or more memory timing parameters of the set for the signaling by:
in response to receiving the user input, temporarily suspending issuance of any new memory access requests to the memory controller,
in response to detecting the memory controller has become idle, overwriting a value in a control register with a corresponding updated value from the user input, and
reactivating the memory controller with the one or more updated values stored to the control register; and
conducting one or more memory access operations for the memory using the reconfigured memory controller.

2. The method of claim 1, wherein receiving user input comprises:
providing a graphical user interface to the user; and
receiving the user input via the graphical user interface.

3. The method of claim 2, wherein dynamically reconfiguring the memory controller to utilize the one or more updated values comprises:
storing each updated value to a corresponding control register of the memory controller, wherein the control register configures a corresponding component of the memory controller to control a corresponding memory timing parameter in accordance with the stored value.

4. The method of claim 3, wherein:
the memory controller comprises a memory controller of a graphics subsystem of the processing system;
the memory comprises a graphics memory;
providing the graphical user interface comprises providing the graphical user interface by executing an application at a central processing unit (CPU) of the processing system; and
storing each updated value to a corresponding control register of the memory controller comprises storing the updated value to the control register using a device driver for the graphics subsystem that is executed at the CPU.

5. The method of claim 1, wherein reactivating the memory controller with the one or more updated values stored to the control register comprises:
storing a copy of the one or more memory timing parameters from a control register to a buffer of a circuit of the memory controller that controls an aspect of memory signaling between the memory controller and the corresponding memory of the processing system.

6. The method of claim 1, further comprising:
providing a user with a plurality of pre-configured value sets for the set of one or more memory timing parameters, each value set having a specified value for each of the set of one or more memory timing parameters; and
wherein receiving user input comprises receiving user input indicating selection of a particular one of the plurality of pre-configured value sets.

7. The method of claim 1, wherein:
the memory controller comprises a memory controller of a graphics subsystem of the processing system; and
the memory comprises a graphics memory.

8. The method of claim 7, wherein:
receiving user input comprises receiving user input via an application executed by a central processing unit (CPU) of the processing system; and
dynamically reconfiguring the memory controller comprises dynamically reconfiguring the memory controller via a device driver executed by the CPU.

9. A processing system comprising:
a memory controller coupleable to a random access memory (RAM);
a read-only memory (ROM) configured to store boot information, wherein the boot information includes default values for a set of one or more memory timing parameters; and
at least one processor coupled to the memory controller and the ROM, the at least one processor configured to:
during initialization of the processing system, configure the memory controller to utilize the default values for the set of one or more memory timing parameters for signaling between the memory controller and the RAM; and
during operation of the processing system following initialization:
receive user input representing an updated value for one or more memory timing parameters of the set; and dynamically reconfigure the memory controller to utilize the updated value for a corresponding memory timing parameter of the set for the signaling by:
  in response to receiving the user input, temporarily suspending issuance of any new memory access requests to the memory controller,
  in response to detecting the memory controller has become idle, overwriting a value in a control register with a corresponding update value from the user input, and
  reactivating the memory controller with the one or more updated values stored to the control register; and
wherein the processing system is configured to conduct one or more memory access operations for the RAM using the reconfigured memory controller.

10. The processing system of claim 9, wherein the at least one processor is configured to receive user input by:
  providing a graphical user interface to the user; and
  receiving the user input via the graphical user interface.

11. The processing system of claim 10, wherein the at least one processor is configured to dynamically reconfigure the memory controller to utilize the updated value by storing the updated value to a control register of the memory controller, wherein the control register configures a corresponding component of the memory controller to control a corresponding memory timing parameter in accordance with the stored value.

12. The processing system of claim 10, wherein:
  the memory controller comprises a memory controller of a graphics subsystem of the processing system;
  the RAM comprises a graphics memory;
  the at least one processor is configured to provide the graphical user interface by executing an application at a central processing unit (CPU) of the processing system; and
  the at least one processor is configured to store the updated value to a corresponding control register using a device driver for the graphics subsystem executed at the CPU.

13. The processing system of claim 10, wherein reactivating the memory controller with the one or more updated values stored to the control register comprises:
  storing a copy of the one or more memory timing parameters from a control register to a buffer of a circuit of the memory controller that controls an aspect of memory signaling between the memory controller and the corresponding memory of the processing system.

14. The processing system of claim 9, wherein the at least one processor is configured to receive user input by:
  providing the user with a plurality of pre-configured value sets for the set of one or more memory timing parameters, each value set having a specified value for each of the set of one or more memory timing parameters; and
  receiving user input indicating selection of a particular one of the plurality of pre-configured value sets.

15. The processing system of claim 9, wherein:
  the memory controller comprises a memory controller of a graphics subsystem of the processing system; and
  the memory comprises a graphics memory.

16. The processing system of claim 15, wherein:
  the at least one processor includes a central processing unit (CPU) configured to receive the user input via an application executed by the CPU; and
  the CPU is configured to dynamically reconfigure the memory controller via a device driver executed by the CPU.

17. A non-transitory computer readable medium embodying a set of executable instructions, the set of executable instructions to manipulate at least one processor to:
  provide a graphical user interface (GUI) to a user of a processing system to facilitate user selection of one or more values for one or more corresponding memory timing parameters for a memory controller of the processing system; and
  dynamically update the memory controller to utilize the user-selected one or more values for corresponding memory timing parameters for signaling between the memory controller and a corresponding memory of the processing system by:
    in response to the user selection of one or more values, temporarily suspending issuance of any new memory access requests to the memory controller,
    in response to detecting the memory controller has become idle, overwriting a value in a control register with a corresponding updated value from the user input, and
    reactivating the memory controller with the one or more updated values stored to the control register.

18. The non-transitory computer readable medium of claim 17, wherein the set of executable instructions to manipulate at least one processor to provide the GUI comprises executable instructions to manipulate the at least one processor to:
  provide a user with a plurality of pre-configured value sets for the set of one or more memory timing parameters via the GUI, each value set having a specified value for each of the set of one or more memory timing parameters; and
  receive user input via the GUI, the user input indicating selection of a particular one of the plurality of pre-configured value sets.

19. The non-transitory computer readable medium of claim 17, wherein:
  the memory controller comprises a memory controller of a graphics subsystem of the processing system; and
  the memory comprises a graphics memory.

20. The non-transitory computer readable medium of claim 19, wherein:
  executable instructions of the set of executable instructions to manipulate at least one processor to provide the GUI comprise executable instructions of a software application executed by a central processing unit (CPU) of the processing system; and
  executable instructions of the set of executable instructions to manipulate at least one processor to dynamically reconfigure the memory controller comprise instructions of a device driver executed by the CPU.

* * * * *

UNITED STATES PATENT AND TRADEMARK OFFICE
CERTIFICATE OF CORRECTION

| | | |
|---|---|---|
| PATENT NO. | : 11,079,945 B2 | |
| APPLICATION NO. | : 16/137413 | |
| DATED | : August 3, 2021 | |
| INVENTOR(S) | : Omer Irshad and Joohyun Lee | |

It is certified that error appears in the above-identified patent and that said Letters Patent is hereby corrected as shown below:

In the Claims

Column 13 Line 9, Claim 9, please replace the word "update" with "updated"

Signed and Sealed this
Fourteenth Day of February, 2023

Katherine Kelly Vidal
*Director of the United States Patent and Trademark Office*